T. H. JACOB.
CIRCULATING DEVICE FOR AUTOMOBILE COOLING SYSTEMS.
APPLICATION FILED OCT. 11, 1917.

1,267,416.

Patented May 28, 1918.

UNITED STATES PATENT OFFICE.

THOMAS H. JACOB, OF WAUSAU, WISCONSIN.

CIRCULATING DEVICE FOR AUTOMOBILE-COOLING SYSTEMS.

1,267,416.  Specification of Letters Patent.  Patented May 28, 1918.

Application filed October 11, 1917. Serial No. 195,954.

*To all whom it may concern:*

Be it known that I, THOMAS H. JACOB, a citizen of the United States, and resident of Wausau, in the county of Marathon and State of Wisconsin, have invented certain new and useful Improvements in Circulating Devices for Automobile-Cooling Systems; and I do hereby declare that the following is a full, clear, and exact description thereof.

My invention relates to certain new and useful improvements in water cooling systems for automobiles, and refers more particularly to a water cooling system of the thermo-siphon type.

Considerable trouble has been experienced with automobiles in winter time, in that when the motor is stationary, the water cooling system is inoperative and often freezes, which causes considerable damage to the automobile engine.

Hence, my invention has for its primary object to insert a suitable heating element in the water cooling system near the outlet of the radiator whereby circulation in the system is maintained after the automobile engine has been stopped.

A further object of this invention is to provide a simple and neat manner of retaining the heating element in the cooling system and for connecting the same with a suitable source of power for supplying heat thereto.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

Figure 1:
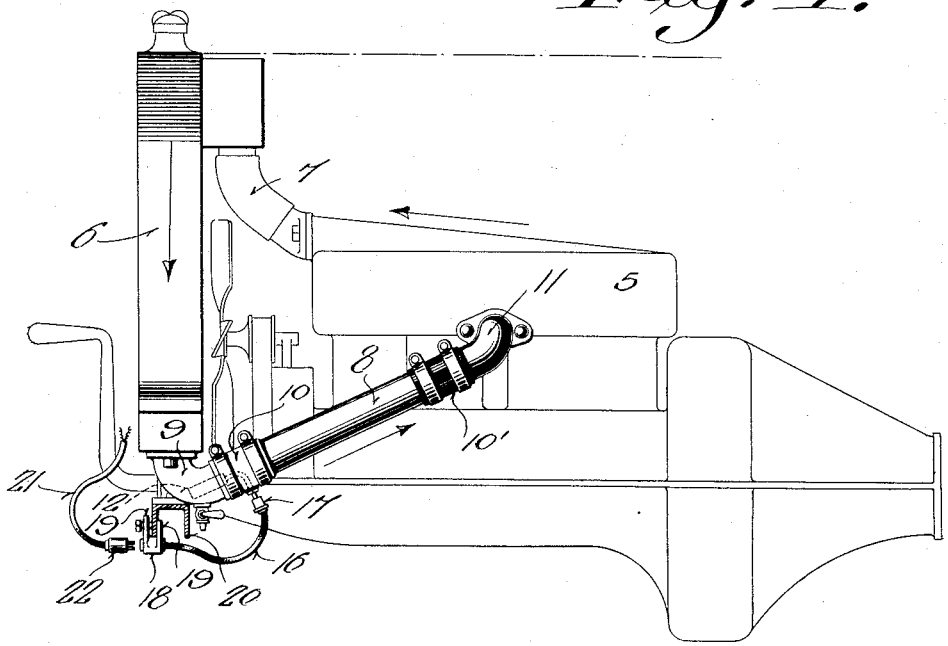
Figure 2:
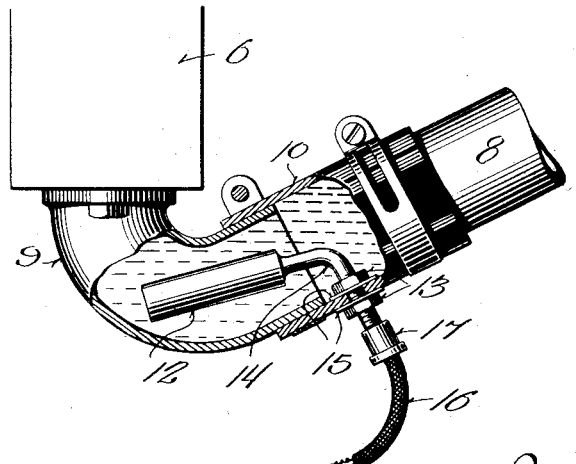

In the accompanying drawing, I have illustrated one complete example of the physical embodiment of the present invention constructed according to the best mode I have so far devised for the practical application of the principles thereof, and in which:

Figure 1 is a side plan view of an automobile equipped with my invention, the automobile engine being shown in conventional outlines, and Fig. 2 is a view of the coupling leading from the base of the radiator, said view having parts broken away and in section to more clearly illustrate the manner of securing the resistance or heating element in the system.

Referring now more particularly to the accompanying drawing, 5 designates an automobile engine of conventional type having its water jacket connected with the upper portion of a radiator 6 by means of a coupling 7 and with the lower portion of the radiator by means of a pipe or nipple 8 secured to radiator outlet 9 by means of a short rubber hose or other coupling 10 and to the water jacket inlet 11 by means of a coupling 10' similar to coupling 10.

The water cooling system just described is of the well known thermo-siphon type and while my invention has been shown in the accompanying drawing as associated with such a cooling system it will be understood that the same can be utilized with a water cooling system including a force pump. A resistance coil or other heating element 12 is disposed in the outlet 9 of the radiator and held therein by means of clamp or binding nuts 13 engaging that portion of the threaded shank 14 of element 12 which passes through coupling 10, as best shown in Fig. 2.

Suitable washers 15 are disposed about shank 14 between nuts 13 and coupling 10 whereby the leakage of water from the system around shank 14 where it passes through coupling 10 is prevented.

The heating element 12, which is preferably an electrical resistance coil has its feed wire 16 preferably insulated and connected therewith through shank 14, a threaded coupling 17 retaining the wire in place. As best shown in Fig. 1, wires 16 have their outer ends secured in a female portion 18 of a connector which is provided with a pair of lugs 19 for engaging the automobile frame 20 to which it is secured by a suitable set screw.

A wire 21 is connected with any suitable source of power, preferably a storage battery, not shown, and has secured on its end a male portion 22 of said connector adapted for engagement with part 18 to thus supply current to the resistance coil 12.

As best shown in Fig. 2, the coil 12 is held by means of nuts 13 from engagement with the metallic portion of coupling 9 so that danger from short circuiting or grounding is eliminated. As will be readily understood by those skilled in the art to which an invention of this character appertains, when motor 5 is shut off, electrical current is turned on to heat coil 12 which will continue the circulation of the water in the cooling system and thus prevent its freezing.

I claim:—

1. The combination with a fluid cooling system of an internal combustion engine including a flexible hose coupling having an opening through its wall, of an electric heating element disposed in said hose coupling, a hollow threaded shank extending from said element and projected through the opening in said coupling, a pair of washers on said shank and disposed one on each side of the wall of the coupling around the opening therein, clamping nuts threaded on said shank on each side of the wall of the coupling to bind the same between said washers, and a conducting wire extended through said hollow shank.

2. The combination with an internal combustion engine, an angle bar support therefor, and a fluid cooling system for said engine including a pipe, of an electric heating element disposed in said pipe and having a shank projected through an opening therein, a female connector member having a pair of spaced lugs to receive one flange of said angle bar support, a set screw for clamping the member to the support, a male connector member engageable with said female member, and a feed wire extending from the female member to the shank of said heating element.

In testimony that I claim the foregoing I have hereunto set my hand at Wausau, in the county of Marathon and State of Wisconsin.

THOMAS H. JACOB.